ates Patent [19] [11] 4,250,750
Martinec et al. [45] Feb. 17, 1981

[54] LIQUID LEVEL MEASURING SYSTEM

[75] Inventors: Richard C. Martinec, Sterling Heights; James I. Berry; Paul D. Stokes, both of Livonia, all of Mich.

[73] Assignee: Ford Motor Company, Dearborn, Mich.

[21] Appl. No.: 83,012

[22] Filed: Oct. 9, 1979

[51] Int. Cl.³ .............................................. G01F 23/101
[52] U.S. Cl. ........................................ 73/308; 73/313
[58] Field of Search ............... 73/313, 308, 362 AR, 73/304 R, 301, 304 C; 340/753, 793, 754, 715

[56] References Cited

U.S. PATENT DOCUMENTS

| 3,333,469 | 8/1967 | Godfrey . | |
|---|---|---|---|
| 3,334,339 | 8/1967 | McCauley . | |
| 3,376,568 | 4/1968 | Stewart . | |
| 3,614,762 | 10/1971 | Childs . | |
| 3,623,043 | 11/1971 | Bozoian . | |
| 3,754,121 | 8/1973 | Delay | 340/753 |
| 3,855,585 | 12/1974 | Stout . | |
| 3,872,728 | 3/1975 | Joyce | 73/362 AR |
| 3,886,518 | 5/1975 | Bozoian . | |
| 3,911,374 | 10/1975 | Busse | 73/362 AR |
| 3,938,117 | 2/1976 | Bozoian . | |
| 4,010,444 | 3/1977 | Shah . | |
| 4,037,193 | 7/1977 | Uemura . | |
| 4,086,812 | 5/1978 | Lüthe . | |
| 4,102,191 | 7/1978 | Harris | 73/313 |
| 4,107,658 | 8/1978 | Hill . | |

Primary Examiner—Gerald Goldberg
Assistant Examiner—Denis E. Corr
Attorney, Agent, or Firm—Paul K. Godwin, Jr.; Clifford L. Sadler

[57] ABSTRACT

A method and apparatus for accurately measuring the level of liquid in a storage tank and graphically displaying that measurement. The system is particularly useful in vehicular fuel level measuring applications, since the system provides for sampling the level of the liquid over designated time periods and comparing each sample reading with a previous sampling that is stored and presently controls the display. The graphical display is a unique bar graph comprised of groups of bar-like elements driven to provide a relative indication of the sensed and measured liquid level in contrast with the maximum level that may be sensed.

22 Claims, 9 Drawing Figures

LIQUID LEVEL MEASURING SYSTEM

The present invention relates to the field of liquid level measuring and, more specifically, to an electronic method and apparatus for accurately measuring contents of a vehicular fuel storage tank.

It is a purpose of the present invention to provide an accurate graphical indication of the amount of liquid remaining in a storage tank.

It is another object of the present invention to provide an accurate graphical indication of the amount of liquid remaining in a storage tank as contrasted with the total measurable volume of the tank.

It is still another object of the present invention to provide a method an apparatus whereby accurate graphical indication of liquid level is achieved without regard to movement of the liquid within the tank.

It is yet another object of the present invention to provide a vehicular electronic fuel gauge whereby an initial sample is made and displayed at startup and subsequent samples are compared with the displayed sample to verify said subsequent sample measurements.

It is a further object of the present invention to provide a vehicular electronic fuel gauge whereby the reasonableness of the measured sample is compared with a predetermined maximum sample value to determine a fault in the sensing system.

It is still a further object of the present invention to provide a programmed vehicular fuel gauge that may be calibrated for use with vehicles having different size tanks and differently configured tanks.

The above objects are achieved by utilizing a conventional liquid level sensor having electrical characteristics which change with the height of the level in the tank and that change is output in the form of an analog signal. The analog signal from the liquid level sensor is then converted to a cyclical signal having a frequency that is controlled by the value of the analog signal within a predetermined range of frequencies. That range of frequencies corresponds to the maximum and minimum analog signals that are produced by the liquid level sensor. The cyclical signal is then sampled over a predetermined time period dictated by one of several sampling modes to produce a digital value which is scaled according to a predetermined computation dictated by the size and configuration of the particular liquid storage tank. The scaled digital value signal may then be stored and used to control the graphical display module. Initially, when the system is turned on, the first sampled digital value signal is used for controlling the display. All subsequent sample signals are compared with the controlling digital value signal to determine whether the presently controlling digital value signal should be updated with a new digital value.

The graphical display module which is utilized in the preferred embodiment of the present invention represents a bar graph utilizing four groups of horizontally disposed bar-like display elements wherein each group represents an equal fraction of the maximum level to be indicated on the display. The display module also contains graphic display elements "E", "½" and "F", which define graduations of the maximum level to be displayed. In addition, a graphical element depicting a fuel pump is termed an "ISO" and is employed as an international fuel gauge standard. In this case, it is also used to indicate an empty condition by being flashed at a predetermined rate.

As a fault indication, the graduation display elements are flashed as a diagnostic warning if there is an open condition such as a broken connection between the measuring system and the liquid level sensor.

The system is controlled by a microcomputer programmed to provide the above noted functions, to multiplex the display and to also provide a nonfluttering display which would otherwise be caused by moving liquid (slosh) within the storage tank.

Figure 1:
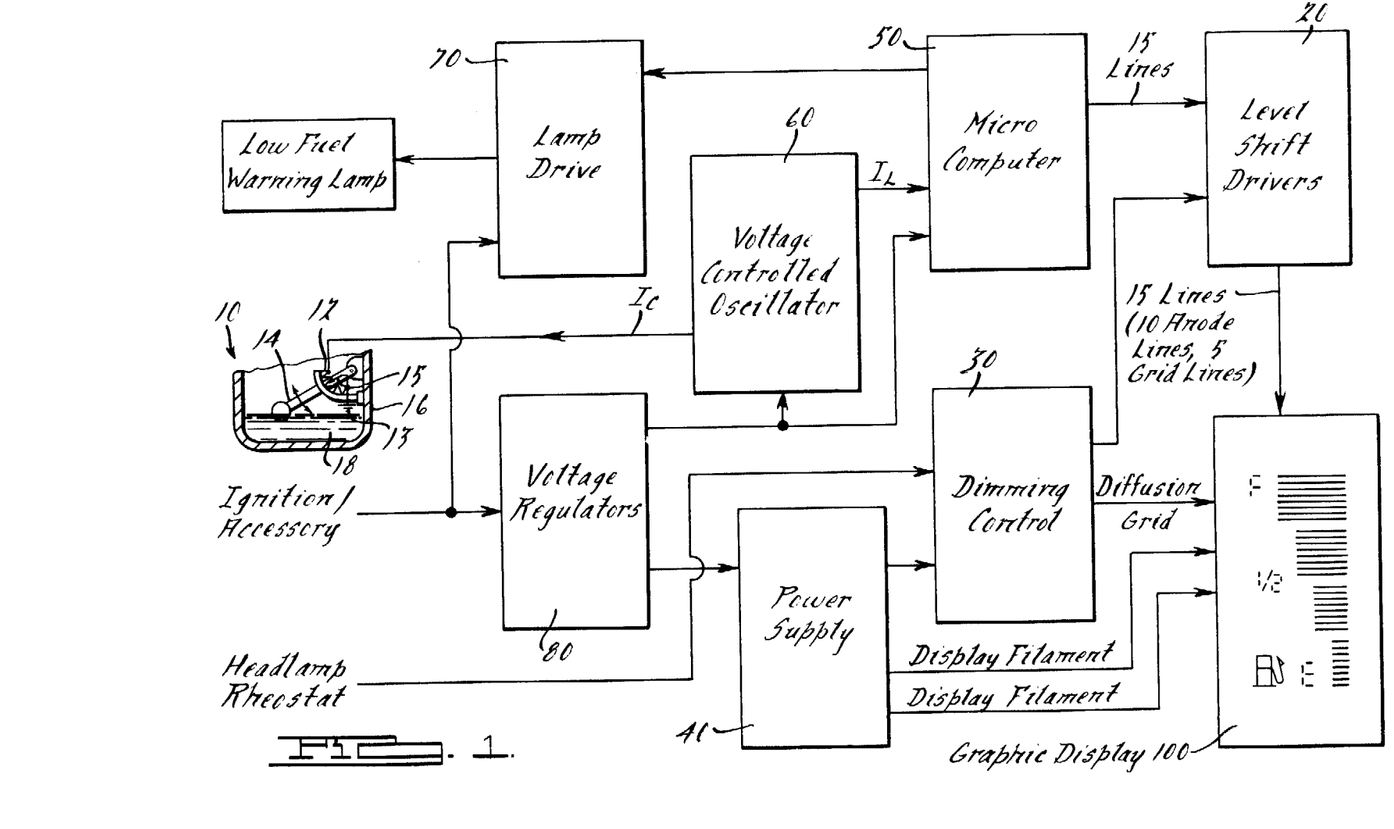
FIG. 1 is a block diagram illustrating the major components of the preferred embodiment of the subject invention.

The liquid level sensor of the present invention is described hereinafter as embodied in an electronic fuel gauge which graphically indicates the remaining fuel level in the fuel tank of an associated vehicle on a bar graph display module 100, shown in FIG. 1.

The display module 100 is a vacuum fluorescent type and consists of 32 horizontal bars arranged in four vertically arranged groups of eight bars each. Fuel level is indicated by the number of bars that are brightly lit. Full indication is displayed when all 32 bars are brightly lit, half full indication is displayed when the bottom 16 bars are brightly lit and the top 16 bars are dimly lit (approximately 1/20th of the brightness of the brightly lit bars), and an empty indication is displayed when all the bars are off.

The display module 100 also contains graduation indicator graphic display elements F, ½ and E vertically arranged alongside the 32 bars. These elements are continuously brightly lit when the fuel gauge is functioning properly and indicating a particular fuel level. However, in the event of a system malfunction (e.g., open line between the level sensor and the measuring system), the graduation indicator display elements are brightly flashed at a rate of approximately 1 Hz.

A graphical representation of a fuel pump is also found on the graphic display 100. This is termed an "ISO" symbol and is an internationally accepted symbol for indicating a fuel gauge. When the display presents an empty indication (e.g., all the bars are off), the ISO display element is brightly flashed at a rate of approximately 1 Hz.

The system further includes a low level warning lamp 72 which is separate from the graphic display module 100 and is activated by the system through a lamp driver 70 whenever the graphic display is controlled to indicate a level of ⅛ or below (four bars or less).

The liquid level sensor, designated as 10, is included in a liquid storage tank 16 and comprises a float arm 14 which is pivitally connected with respect to the tank 16. In automotive terminology, such a sensor 15 is commonly referred to as a "fuel sender". A rigidly mounted potentiometer 12 has a wiper 15 which changes position on the windings of the potentiometer 12 as the float 14 changes position with respect to various levels of the liquid 18 within the fuel tank 16. One end of the potentiometer 12 and the slide 15 are gounded at 13. The other end of the potentiometer 12 is electrically connected to a voltage controlled oscillator 60. In this embodiment, the voltage controlled oscillator 60 generates a constant current $I_c$ that is dropped across the potentiometer 12 to ground 13.

The voltage controlled oscillator 60 senses changes in the electrical resistance characteristic of the potentiometer 12 and generates a square wave signal of a frequency which is proportional to the voltage drop across the potentiometer 12. In this case, the frequency range of the voltage controlled oscillator varies from 5.5 Hz when the float 14 is at its minimum lower level in the tank 16 indicating an empty tank, to 200 Hz when the float 14 is at its maximum upper level indicating a full tank. A conventional voltage regulator 80 converts conventional automotive accessory power of approximately 12 volts to a regulated 9.3 volts, which is then supplied to the voltage controlled oscillator 60 and a microcomputer 50. Regulated voltage is also applied to the display power supply 40 where appropriate voltages of three volts RMS and 26 volts DC are respectively generated for the cathode filaments of the graphic display module 100 and a dimming control circuit 30.

The dimming control circuit 30 functions in conjunction with a headlamp rheostat to control the brightness of the display by applying appropriate voltages to a diffusion grid of the graphic display module 100 and to the level shift driver circuit 20.

The microcomputer 50 is programmed to sample the output of the voltage controlled oscillator 60 over a selected one of several predetermined sampling time periods and convert the sampled signal to a digital signal which may be used to control the elements displayed on the graphic display module 100 via the level shift driver circuit 20. The microcomputer 50 also controls the low fuel warning lamp 72 and commands its activation through drive lamp circuit 70 whenever the digital value controlling the graphic display module 100 is at a level indicating the fuel tank 16 to be ⅛ full or less.

Figure 2A:
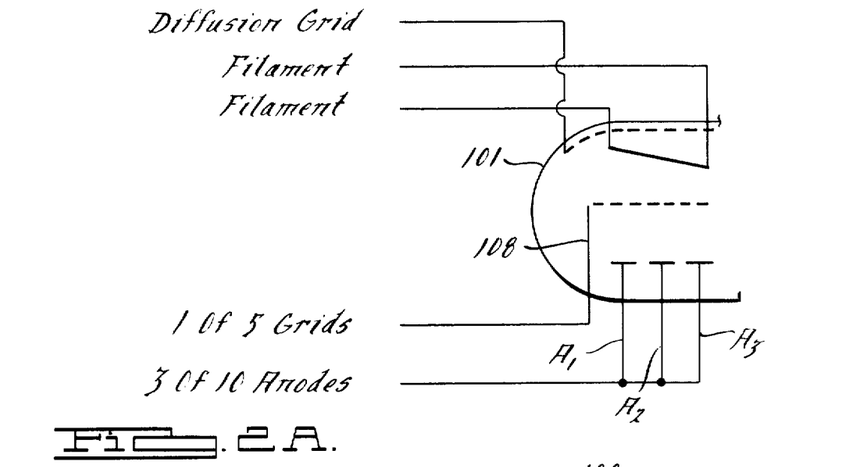
FIG. 2a is a partial schematic of a vacuum fluorescent device such as the type employed as a graphic display module in FIG. 1.

In FIG. 2a, a partial cross-section of the vacuum fluorescent display module 100 is schematically represented. The display module comprises a direct connected filament cathode which extends transversely with respect to several anode elements exemplified as $A_1$, $A_2$ and $A_3$. A screen grid 108 is located between the filament cathode and associated anodes to regulate the electron flow from the cathode to the anodes. A diffusion grid is schematically illustrated as being adjacent the upper portion of the glass envelope 101. However, in actuality, it is a transparent conductive layer deposited on the inside of the glass envelope 101 to eliminate an inherent irregularity in the display pattern on the display anodes. The anodes are each coated with a fluorescent phosphorus and emit a blue-green light when struck by electrons, which are emitted from the cathode and transverse the screen grid 108. Therefore, whenever both an anode and its associated screen grid are positive with respect to the filament cathode electron, current flows from the cathode through the grid and to the anode wherefrom light is emitted towards the transparent diffusion grid and through the glass envelope 101 for viewing. Conversely, when a particular anode is the same or less positive than the cathode, and its associated screen grid is more positive than the cathode, that particular anode is not activated and therefore does not emit light.

Figure 2B:
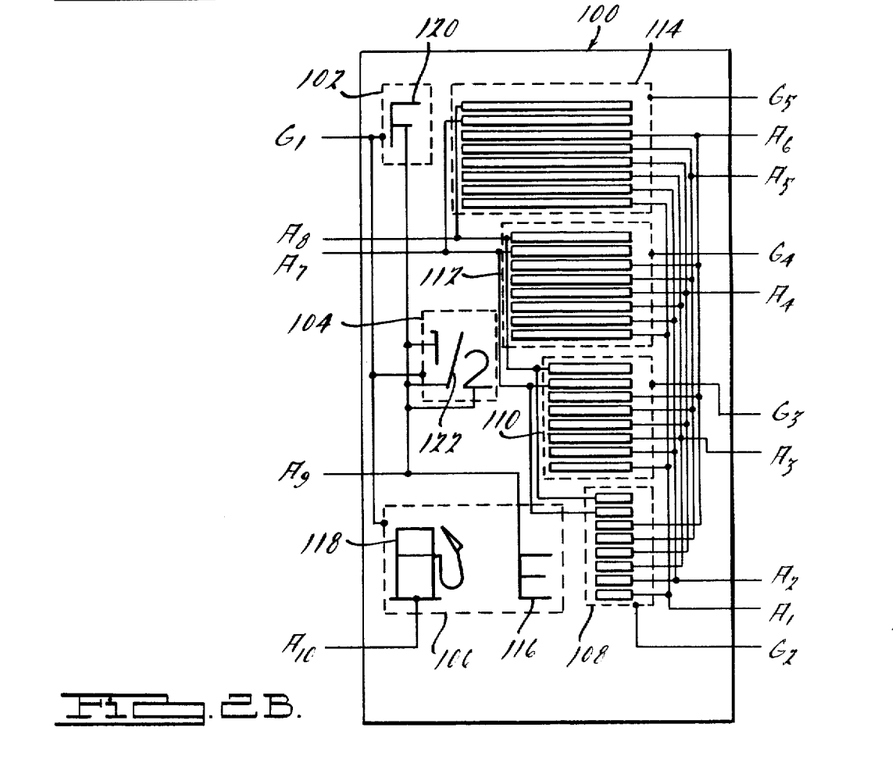
FIG. 2b is a detailed wiring diagram of the graphic display module illustrated in FIG. 1.

The graphical display module 100 is further illustrated in FIG. 2b wherein the wiring connections for the various anode display elements and screen grids are indicated. In this example, 32 horizontally arranged, bar-like display elements are shown and separated into four groups of eight to represent identical fractions of the measurable capacity of the fuel tank. Each group of eight bar-like display elements is controlled by one of the corresponding screen grids 108, 110, 112 and 114. The graduation anode elements F, ½ and E, along with the ISO symbol anode element, are controlled by screen grids 102, 104 and 106. Screen grids 102, 104 and 106 are commonly connected to grid lead $G_1$, while screen grid 108 is connected to grid line $G_2$, screen grid 110 is connected to grid line $G_3$, screen grid 112 is connected to grid line $G_4$, and screen grid 114 is connected to grid line $G_5$. In the four groups of eight bar-like anode display elements, the lowermost bar of each is commonly connected to anode line $A_1$. The seven remaining bar-like anode elements of each group are correspondingly connected to respective grid lines $A_2$, $A_3$, $A_4$, $A_5$, $A_6$, $A_7$ and $A_8$. The graduated display elements F, ½ and E are respectively designated as 120, 122 and 116, and are commonly connected to an anode line $A_9$. The ISO symbol anode 118 is connected to anode line $A_{10}$.

Figure 3:
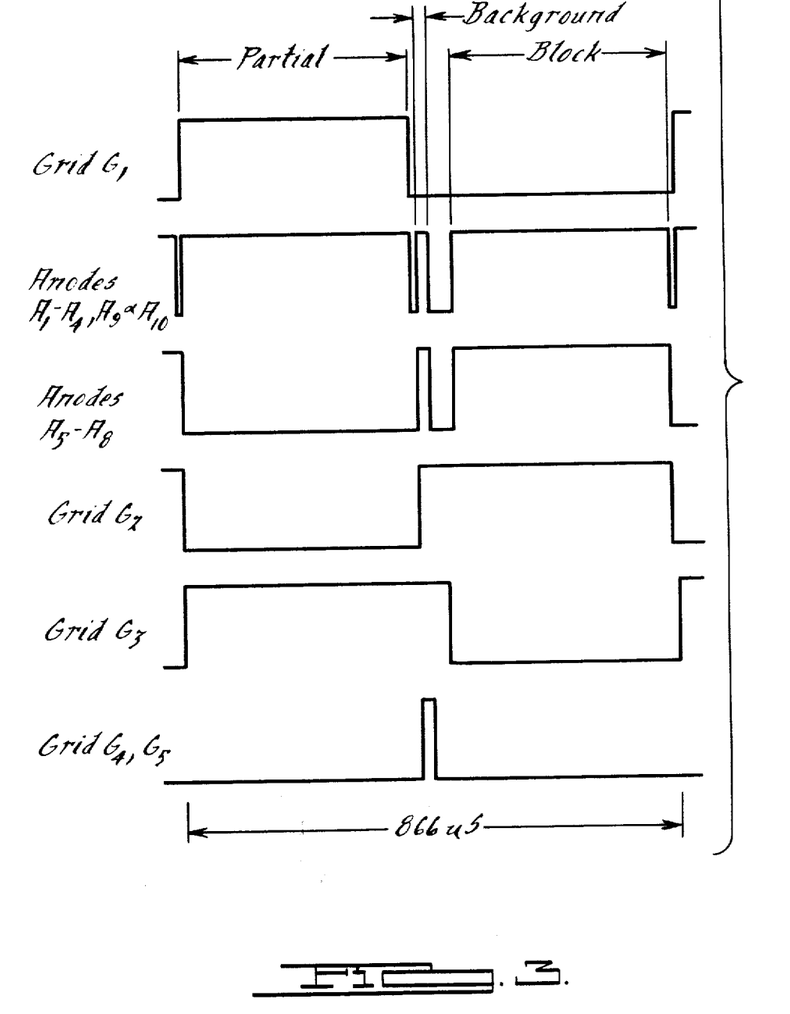
FIG. 3 illustrates an example of the various waveforms applied to the graphic display module during the multiplexing sequence as employed in the present invention.

In order to illustrate the multiplexing technique employed for the display driver module 100, shown in FIG. 2B, an example of a ⅜ volume level has been selected. The wave forms, utilized to obtain a bright display level of the lowermost 12 bars and to obtain a dim display level of the upper 20 bars, are illustrated in FIG. 3. The multiplexing signal is divided into three time periods wherein the brightly lit segments of the display have an on-time duty cycle of approximately 50%. The first period is designated as "PARTIAL" and is the time when the graduation elements and the ISO element, as well as a partial group of bars (that group selected as the uppermost brightly lit bars of the level indicated on the display) are all on. In this example, where the indicated level is ⅜ of full, the partial block of bar-like anode elements lies under screen grid 110 and comprises the lower four bar-like elements respectively connected to anode lines $A_1$, $A_2$, $A_3$ and $A_4$. Therefore, during the PARTIAL time period, grid lines $G_1$ and $G_3$, as well as anode lines $A_1$, $A_2$, $A_3$, $A_4$, $A_9$ and $A_{10}$, are all made more positive than the filament cathode line to thereby effect electron flow to the lower four bar-like anode display elements, the graduation display elements and the ISO display element to cause those anodes to be brightly lit.

A second multiplex time period is designated as the "BACKGROUND" time period which has a relationship of approximately 1/20 of the first period. During the BACKGROUND period, all of the bar-like anode elements and their associated grids are activated with a short duration, positive pulse to cause a low light level emission from those anodes which are not otherwise activated in the multiplexing sequence. In this example, all twenty bar-like elements above the ⅜ level will be dimly lit with respect to the brightly lit bar-like elements below that level.

The third multiplexing time period is designated as the "BLOCK" time period in which entire groupings of eight bar-like anode display elements are intended to be displayed. In this example, the lowest block of eight bar-like elements associated with grid 108 are activated by applying positive voltage to grid line $G_2$ and to anode lines $A_1$ through $A_8$. The entire multiplexing scan cycles at a rate of 1155 per second to give the observer a non-flickering type display that contrasts the measured liquid level with the entire range of the measurable levels.

The output of the level shift driver circuit 20 outputs activating voltages which may vary from approximately 6 to 26 volts DC, depending upon the controlled output of the dimming control circuit 30 and the associated headlamp rheostat setting to control the brightness of the display.

The microcomputer 50, employed in the preferred embodiment, is a standard NMOS design utilizing a ROM containing a software program pattern outlined in the logic flow diagrams of FIGS. 4–8. In this instance, the ROM has a capacity of $1024 \times 8$ BITS. The microcomputer 50 also contains $64 \times 4$ BITS of RAM, 16 latchable output lines (one "LFW" low fuel warning lamp command line, 10 anode lines, and 5 grid lines), an internal oscillator for timing, a four BIT arithmetic logic unit, and an "IL" input line from the voltage controlled oscillator 60.

Upon initial ignition of the vehicle, the system is turned on and enters a first sample mode "FS". The first sample mode samples the output from the voltage controlled oscillator 60 over a period of approximately 4.15 seconds and stores a scaled version of that count as a digital value "D" indicative of the number of bar-like anode display elements that will be activated during the PARTIAL and BLOCK multiplexing period. When the value of D is derived at the end of the first sample period, the value will be in the range of from $00_{16}$ to $1F_{16}$, which is 00000 to 11111 in binary. By looking at the two most significant BITS of binary, the system is able to determine which grid will be turned on for the partial display. The grid information is stored into one nibble of RAM called "G". The three least significant BITS are decoded into eight BITS (two nibbles) of RAM called "B1" and "B2", with each BIT representing one bar-like anode element of the partial group, as follows:

| 3 Least Significant BITS of "D" | "B1" | "B2" | Anode |
| --- | --- | --- | --- |
| 000 | 0000 | 0001 | $A_1$ |
| 001 | 0000 | 0011 | $A_1, A_2$ |
| 010 | 0000 | 0111 | $A_1$ thru $A_3$ |
| 011 | 0000 | 1111 | $A_1$ thru $A_4$ |
| 100 | 0001 | 1111 | $A_1$ thru $A_5$ |
| 101 | 0011 | 1111 | $A_1$ thru $A_6$ |
| 110 | 0111 | 1111 | $A_1$ thru $A_7$ |
| 111 | 1111 | 1111 | $A_1$ thru $A_8$ |

When the PARTIAL display period is on, the output latches connected to the level shift drivers and corresponding bar-like anode display elements are loaded directly from "B1" and "B2". The output latch to be turned on for the appropriate grid is selected by the value of "G", as follows:

| "G" | GRID |
| --- | --- |
| 0000 | $G_2$ |
| 0001 | $G_3$ |
| 0010 | $G_4$ |
| 0011 | $G_5$ |

When the BACKGROUND display period is activated, the output latches connected to the bar-like anode display elements are all loaded with ones and the output latches for the grids are all turned on. During the BLOCK display period, immediately following the BACKGROUND display period, the grid for the PARTIAL period and all the grids above the partial grid are turned off.

The display is continually multiplexed so as to display a number of bar-like display elements which correspond to the value of D. The system then enters a normal sample mode and the first sample mode FS is turned off.

The normal sample mode averages out the liquid level sensor readings over a time period of approximately 66.5 seconds. The sampled output from the voltage controlled oscillator 60 is converted to a sample value "S" which is then scaled for the normal sample time period and compared with the present value of D used to control the graphic display module 100. If the value of S exceeds the value of D by a predetermined amount (in this case four), the system enters a fast fill mode "FF" wherein subsequent samplings are taken over 4.15 second intervals to track the liquid level as it is changing upwardly at a fast rate. The fast fill mode FF normally occurs when the system is left activated while fuel is added to the tank.

The normally sampled value S is also compared with the presently displayed value of D to determine if D should be lowered by one increment. If a plurality of samples are consistently less than the value of D, then the value of D is decreased by one increment.

The value of S is also checked to determine whether it is outside of the reasonably expected value in order to indicate a fault in the system such as an open circuit between the liquid level sensor 10 and the voltage controlled oscillator 60.

Figure 4:
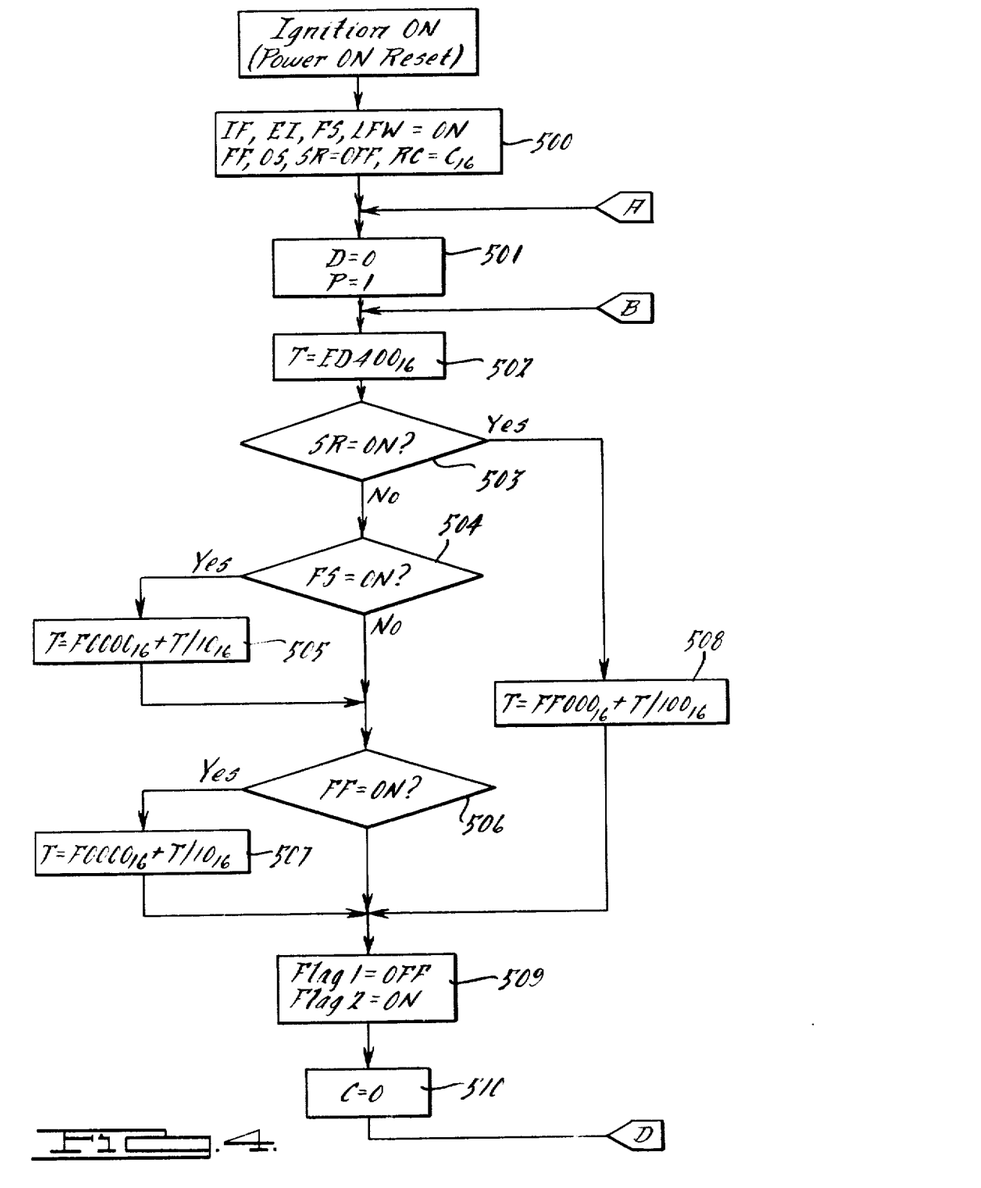
FIGS. 4-8 are detailed logic decision flow diagrams for the microcomputer employed in the preferred embodiment of the subject invention.
Figure 5:
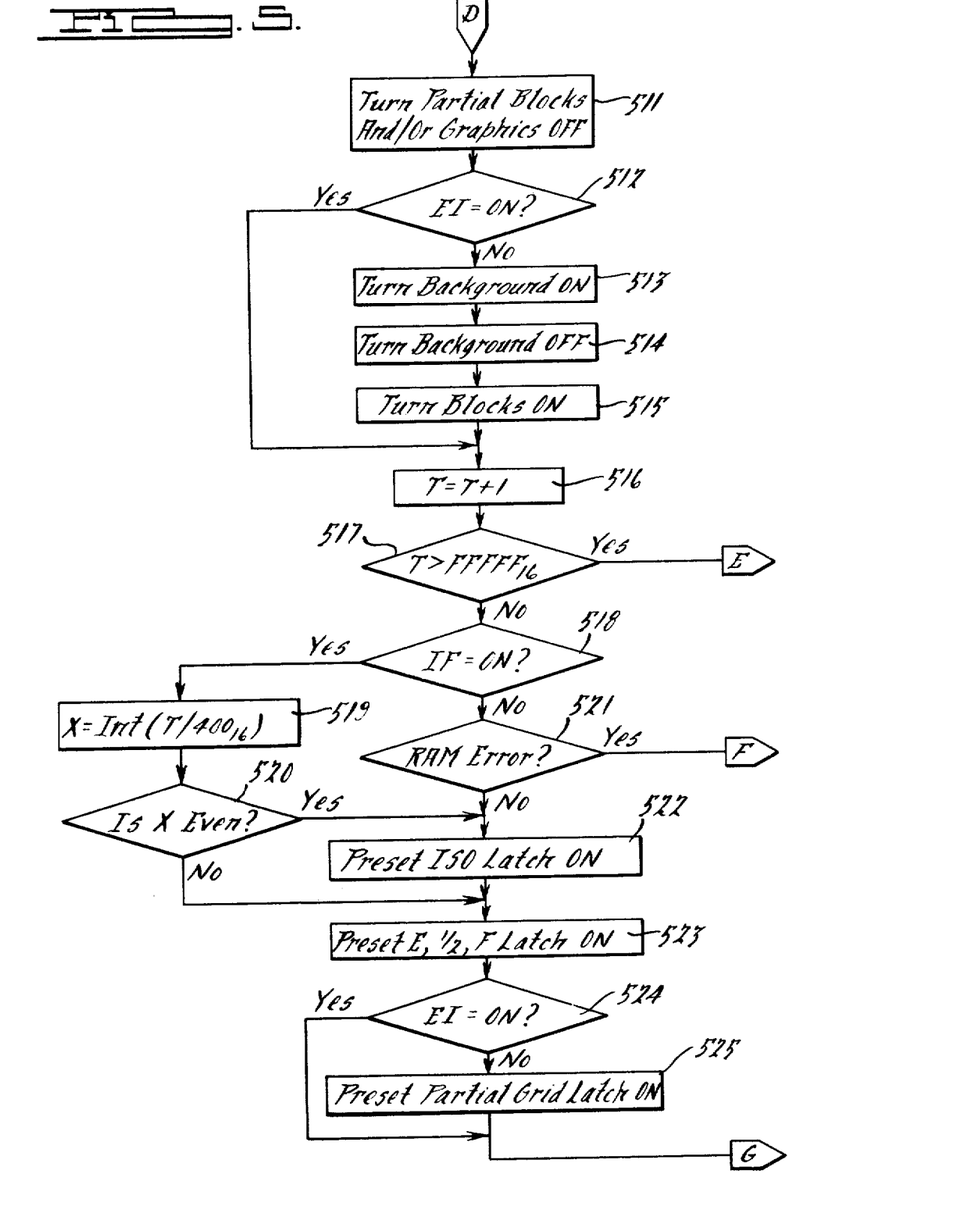
Figure 6:
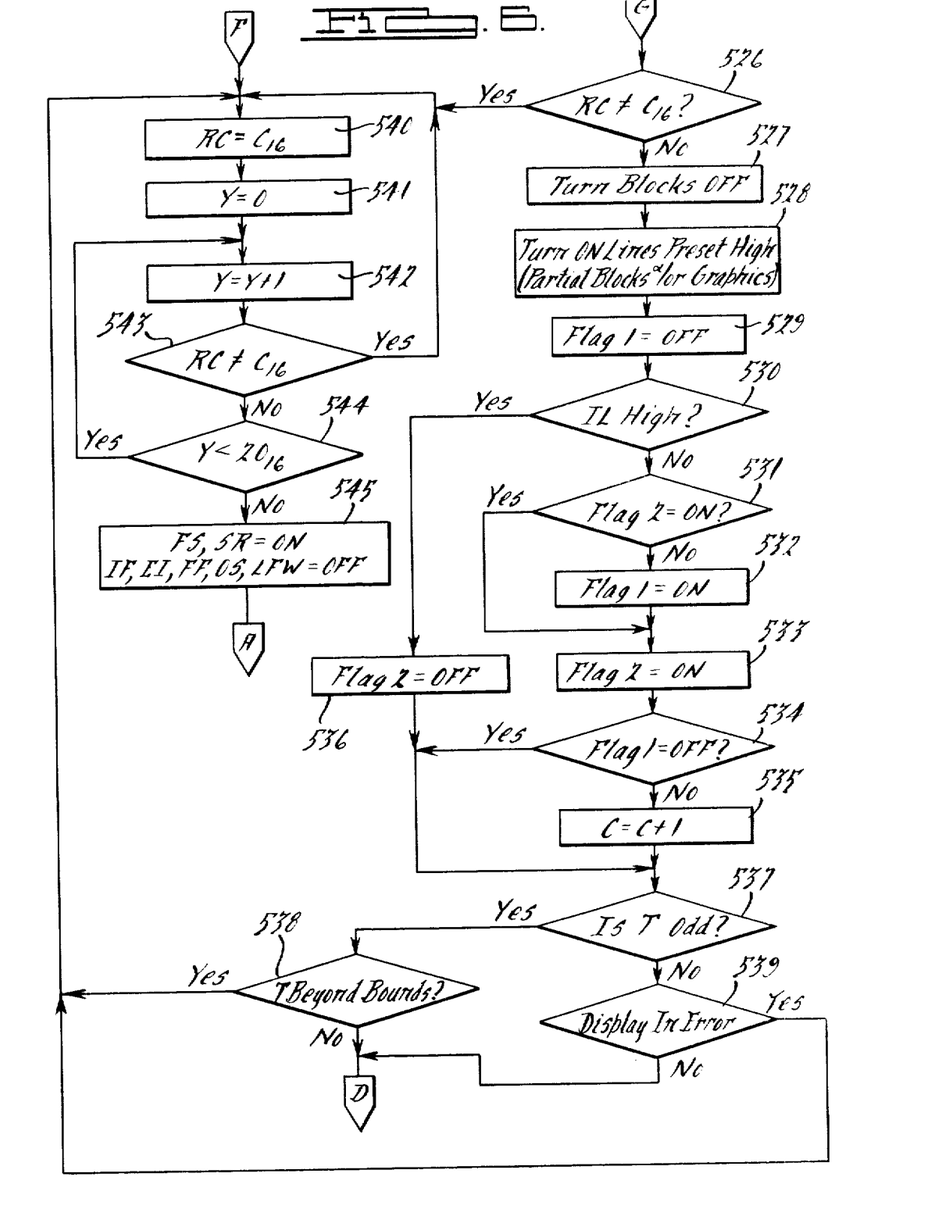
Figure 7:
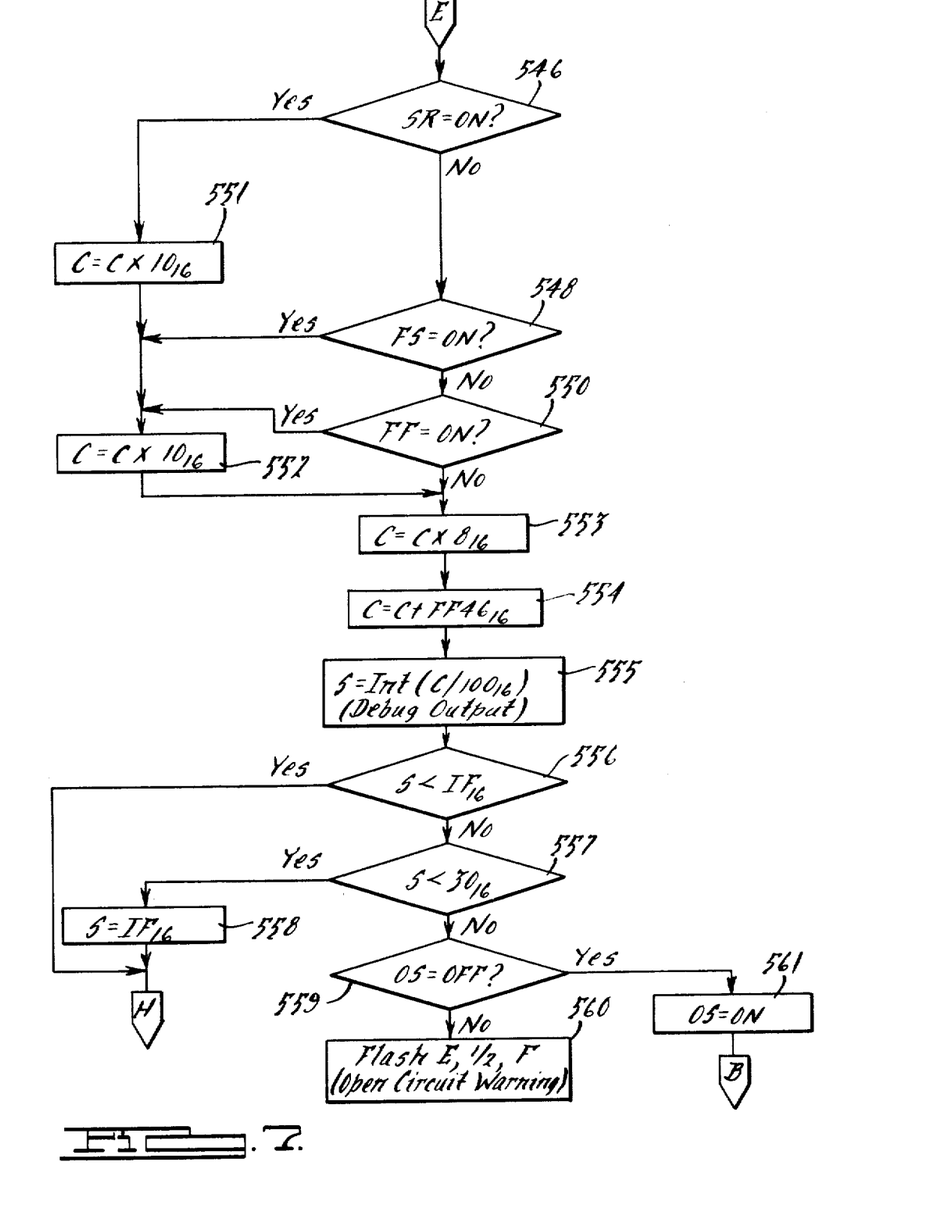
Figure 8:
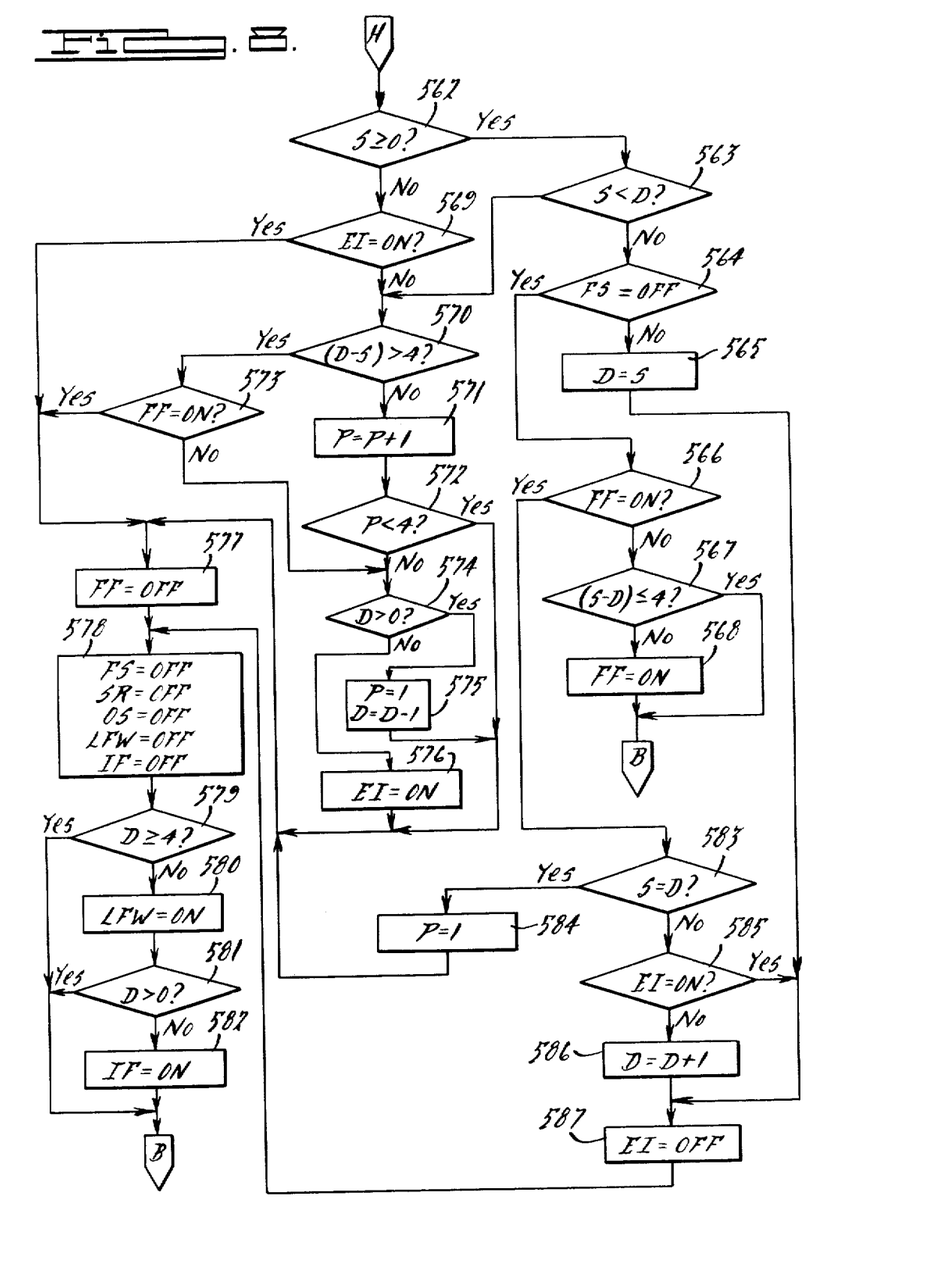

When power is first applied to the system, for example, by an ignition accessory switch, the microprocessor is reset so that it starts execution of its first instruction. The first instruction 500 is shown in FIG. 4, wherein the ISO flash command "IF", the empty indication command "EI", the first sample mode "FS", and the low fuel warning command "LFW" are each set "ON".

Additionally, the fast fill mode "FF", an open sensor command "OS", and a software reset command "SR" are each set "OFF". Instruction 500 also sets a reset character "RC" to have a value $C_{16}$, which is 1100 in the hexadecimal system. The reset character is set in the RAM, occupies one nibble, and is periodically checked to see if the RAM has retained this value.

After the values are set by instruction 500, the current display value D is set equal to zero, a preponderance counter "P" is set equal to one by instruction 501. The sample time counter "T" is set to equal to $ED400_{16}$ by instruction 502 to give a normal sample time mode of approximately 66.5 seconds or 76,790 cycles of the display scan cycle period of 866 microseconds. The value for T in instruction 502 is selected to average out minor variations in the fuel level which occur due to normal vehicular movement and is calibrated to the particular liquid level sensor potentiometer winding and fuel tank configuration.

Following instruction 502, the logic step 503 changes the value in the T counter to $FF000_{16} + T/100_{16}$ with instruction 508, if the software reset command SR is ON to give a ¼ second sample time. However, at this point, SR is OFF due to instruction 500. Therefore, since SR is not ON, the next logic step 504 inquires if the program is in the first sample mode FS. Instruction 500 set the first sample mode FS to ON. The T counter value is then adjusted to $F0000_{16}+T/10_{16}$ by instruction 507 to give a sample time period of approximately 4.15 seconds. However, looking back to step 500, it can be seen that the fast fill mode FF is initially OFF. Therefore, the previous value set in T remains unchanged by logic step 506 and instruction 509 sets a designated FLAG 1 to OFF and a designated FLAG 2 to ON. Sample pulse counter C is set equal to zero by instruction 510. Instruction 511 turns any previously latched partial blocks OFF, and also turns the graphics of the display, which include the F, $\frac{1}{2}$, E and ISO, to OFF.

Logic step 512 inquires the status of the empty indication command EI. If the empty indication command EI is OFF, instructions 513, 514 and 515 provide the multiplexing instructions for the display by sequentially turning the BACKGROUND display elements ON, turning the BACKGROUND display elements OFF, and then turning the BLOCK of display elements ON. However, by referring back to instruction 500, it can be seen that during the first sample mode FS, EI is ON. This is merely an empty indicator lamp check during the first sample and no other display is activated until the end of the first 4.15 second sample time period. When EI is on, instructions 513, 514 and 515 are bypassed and the value of T is advanced by one count in instruction 516.

Logic step 517 inquires whether the T counter has overflowed to indicate the end of a sample time period. If so, the system progresses to logic step 546 to validate the sample count. However, if T has not yet overflowed, logic step 518 inquires if the ISO flash command IF is ON. If not, the reset character RC is checked by logic step 521 to see if it remains the same as set by instruction 500. If the IF is ON, as set by instruction 500, then an integer X is set as the third BIT of the third nibble of T by instruction 519. That integer is chosen because it changes approximately every half second (0.665 second) when the system is in the first sample mode where the sample time period is 4.15 seconds. Subsequently, logic step 520 inquires if integer X is even. If yes, the ISO latch is turned on by instruction 522. If not, instruction 522 is bypassed. The result is a flashing ISO having an on/off cycle of approximately 1 Hz.

The latch for the E, $\frac{1}{2}$ and F anodes are preset to ON by instruction 523. Logic step 524 inquires if the EI command is ON. If not, the designated partial grid latch is set ON in instruction 525. However, if the EI command is ON as set by instruction 501, the instruction 525 is bypassed.

Logic step 526 is the second RAM error check wherein the reset character RC is checked to determine if it has changed from the value $C_{16}$ set by instruction 501. If the RC value has changed, which is possible due to an intermittent voltage loss, such change indicates that all the values stored in RAM may be in error. Therefore, the system enters a RAM verification loop wherein the reset character RC is again set to have a value of $C_{16}$ by instruction 540 and then an arbitrary Y counter is set to have a value of zero by instruction 541. The Y counter is advanced by one count in instruction 542. The reset character is again checked by logic step 542 to see if the value remains at $C_{16}$. If RC is not equal to $C_{16}$ in the logic step 543, the reset character is again set by instruction 540. The system remains in this verification loop until the reset character RC is found to be equal to $C_{16}$ in logic step 543. The Y counter is checked in logic step 544 to see if it is less than $20_{16}$. In essence, the reset character is checked through 32 times to verify that it is holding the reset character value inserted by instruction 540. After 32 checks, the system then sets both the first sample mode FS and the software reset command SR to ON by instruction 545 in order to provide a timing period sample of $\frac{1}{4}$ second and immediately provide a display value by returning to instruction 501. In addition, instruction 545 sets IF, EI, FF, OS and LFW to OFF.

If the reset character in logic step 526 is found to be held at $C_{16}$, instruction 527 is performed, wherein all display blocks are turned OFF. Next, instruction 528 is followed, wherein the display lines for the selected bar-like anode display elements of the partial block and/or the graphics are latched ON by instruction 525.

Instruction 529, which sets FLAG 1 to OFF, begins the sampling of the square wave output signal from the voltage controlled oscillator 60 as input to the microcomputer on input line IL. The method employed is to sample the status of line IL at a rate of once every 866 microseconds (equal to a display cycle) and detect when IL changes from a high level state to a low level state. The highest frequency output from the voltage controlled oscillator is expected to be approximately 270 Hz, which has a cycle period of approximately 3700 microseconds. Therefore, it can be seen that several samplings are made of each square wave cycle. Logic step 530 inquires if the voltage at input line IL is high. If the answer is yes, FLAG 2 is turned OFF by instruction 536 and the system advances to logic step 537. If, however, the input level on line IL is not high, logic step 531 inquires if FLAG 2 is ON. FLAG 2 was turned ON by instruction 509. However, if FLAG 2 had been turned OFF in logic step 531, that would mean that the present sampling of the line IL had changed from a high level to a low level since the last sampling of IL. In that event, FLAG 1 would then be turned ON by instruction 532.

Independent of the answer to logic step 531, FLAG 2 is turned ON by instruction 533 and an inquiry is made in logic step 534 as to whether FLAG 1 is turned OFF. If FLAG 1 is OFF, the previous sampling was not high, compared to the present sampling, and instruction 535 is bypassed. However, if FLAG 1 is not OFF at logic step 534, the previous sampling was high, and the present sampling is low to indicate one cycle should be counted from the voltage controlled oscillator. Therefore, instruction 535 advances the sample pulse counter C by one increment.

Logic step 537 then inquires if the time count T is ODD. This is performed by looking at the least significant BIT in the T register. The purpose of looking at whether or not T is ODD, is to provide two separate system checks which alternate for every display cycle. When T is ODD, logic step 538 is performed, wherein the most significant digit of T is checked to see if it is still set at 1. If the most significant digit is set at a value other than 1, this would mean that the T register has overflowed or that intermittent voltages have destroyed the T value set in RAM. If an error is detected, the system reenters the RAM verification loop starting with instruction 540. Similarly, if T is not ODD in logic step 537, a display error checkout is performed by looking at the value D to see that it is less a maximum predetermined value. If it is greater than the predetermined value, a RAM error is indicated and the system enters the RAM verification loop starting with instruction 540. If, on the other hand, no errors detected in T or D, the system then returns to instruction 511 and T is subsequently incremented by one in instruction 516.

When the T register is incremented to a value greater than $FFFF_{16}$ (overflow) and is detected in logic step 517, the system then scales the accumulated pulse counts stored in C, beginning with logic step 546.

The scaling of C is intended to derive a digital value that will indicate the number of bar-like anode display elements that will be activated in the display 100. Of course, since the system is capable of entering three different sampling time period modes, scaling of the sample count must be made according to the particular sample mode for which those counts were collected. Therefore, the logic step 546 begins scaling by inquiring if the software reset SR in ON. If SR is ON, the C value is adjusted to a value of $C \times 10_{16}$ in instruction 551. If SR is OFF, inquiry is made as the whether the first sample mode FS is ON in logic step 548. If FS is ON, the contents of C are shifted left by one 4 BIT nibble in instruction 552 to have an adjusted value of $C \times 10_{16}$. If FS is not ON, inquiry is made in logic step 550 as to whether the system is in the fast fill mode FF. If FF is ON, C is adjusted to a value of $C \times 10_{16}$, as per instruction 552. If not, a normal sample mode is indicated and C is adjusted to a value of $C \times 8_{16}$ by instruction 553. Further scaling is achieved by instruction 554, wherein C is adjusted to have a value of $C + FF46_{16}$.

The sample result register S is set equal to INT ($C/100_{16}$) in instruction 555 in order to drop the two least significant digits of C and set S with the two most significant digits in hexadecimal. If the hexadecimal value of S is $FF_{16}$, then such a value would indicate an empty fuel level reading. On the other hand, if the hexadecimal value of S is $1F_{16}$, the sample would indicate a full fuel level reading. Thereafter, logic step 556 inquires if S is less than $1F_{16}$. If not, an inquiry is made to whether S is less than $30_{16}$ in logic step 557. If S is not less than $30_{16}$, the sample count stored in S is exceedingly high and indicates that a malfunction has occurred causing the voltage controlled oscillator to produce a frequency higher than the 270 Hz predicted to be output when the sensor indicates the highest level in the tank. Such a malfunction indication occurs when the connection from the level sensor 10 to the voltage controlled oscillator 60 is open. Therefore, inquiry is made as to whether the open sensor command OS is OFF in logic step 559. In instruction 500, the OS was initially turned OFF. Progression to logic step 561 turns the open sensor command OS to ON and another four second sample is taken by returning to instruction 502. If, on the second time through from instruction 502 to logic step 557, the S value is again found to be equal to or greater than $30_{16}$, logic step 559 will cause instruction 560 to set the graduation graphics E, ½ and F to flashing and thereby give an open circuit warning to the operator.

If, in logic step 556, the sample count S is found to be less than $1F_{16}$, the system advances to logic step 562. On the other hand, if S is not less than $1F_{16}$, at logic step 556, but is less than $30_{16}$ in logic step 557, the S value is set at the full value $1F_{16}$ by instruction 558 and the system progresses to logic step 562.

Upon entering logic step 562, the subsequent steps therein are utilized to determine if the most recent scaled sample count value in S is valid, as compared to a previous sample which is presently employed as D to control the number of bar-like anode display elements activated in the graphic display module 100. By making such a comparison, it can be determined if the fuel tank 16 is being filled at a rapid rate (fast fill mode) or whether the most recent sampling indicates that the level has decreased, due to fuel usage, and that the present number of bar-like anode display elements ought to be reduced by 1. In addition, the displayed value D is then compared with a predetermined value in order to decide if either a low fuel warning command LFW, or an empty indication command EI should be made.

Logic step 562 inquires if the sample count value in S is greater than zero. If S is greater than zero, logic step 563 is performed wherein the value of S is compared with the current display value D. Instruction 501, of the first sample mode, set D equal to zero. Therefore, if the answer to logic step 563 is no, logic step 564 is performed, wherein inquiry is made as to whether the first sample mode FS is OFF. If the first sample mode FS is ON, as set by instruction 500, D is set equal to S in instruction 565 and the system progresses to instruction 587. If the first sample mode FS is OFF and the answer to logic step 564 is yes, inquiry is made as to whether the fast fill mode FF is ON in logic step 566. If FF is OFF, logic step 567 is performed to determine if S minus D is less than or equal to 4. If the S value is 4 higher than the presently displayed value D, the fast fill mode FF is turned ON by instruction 568 and another sample is taken at the 4.15 second sample period commencing with instruction 502. If, however, the S value is equal to or less than 4 higher than the presently displayed value D, another sample is taken commencing with instruction 502.

When the fast fill mode FF is turned ON by instruction 568 and another sample is taken wherein the newly sampled S is found to be greater than zero (logic step 562); not less than D (logic step 563); FS is OFF (logic step 564); S is not equal to D (logic step 583); and the EI command is OFF (logic step 585); the value of D is incremented upwards by one (instruction 586). Therefore, as long as the system remains in the FF mode (4.15 second sample time periods), the value of D will continue to be incremented upwards.

Subsequent to incrementing D by a value of one by instruction 586, the EI command is turned OFF and the next 4.15 second sample is taken commencing with instruction 578.

Reconsidering logic step 562, if the S value is greater than zero and less than D, as inquired by logic step 563, then logic step 570 is performed and inquiry is made as to whether D minus S is greater than 4. If the display value D has a value which is equivalent to 4 bar-like anode display elements above the S value, an inquiry is made in logic step 573 as to whether the fast fill mode FF is ON. If FF is not ON, a preponderance counter P is set equal to 1 by instruction 574 and the display value D is reduced by one thereby causing one less bar-like anode display element to be activated.

On the other hand, if D minus S is equal to or less than 4 at logic step 570, P is incremented by one in instruction 571 and inquiry is made as to the value of P in logic step 572. If P is less than 4, the system advances to instruction 577 wherein additional samplings are made until the preponderance counter is incremented to a value of 4. At that time, the system will see that the S values are consistently measured at less than the present value of D by an amount of 4 or less indicating that a new lower level of D should control the display.

In logic step 574, inquiry is made as to the value stored in D. If D is equal to zero, the empty indication command EI is turned ON in instruction 576. If D is greater than zero on logic step 574, D is decreased by one in instruction 575, P is set back equal to one, and the system progresses to instruction 577.

Returning attention to logic step 569 and considering when the sample S is equal to minus one at the same time the empty indicator command EI is ON, the system advances to instruction 577. If, on the other hand, EI is not ON in logic step 569, D minus S is greater than 4 in subsequent logic step 570, and the fast fill mode FF is ON is logic step 573, the system advances to instruction 577.

Instruction 577 turns FF to OFF. The following instruction 578 turns the first sample mode FS to OFF, the software reset command SR to OFF, the open sensor command OS to OFF, the low fuel warning command LFW to OFF, and the ISO flash command IF to OFF. Subsequently, the value of D is evaluated in logic step 579 to determine if the low fuel warning command LFW should be turned ON by instruction 580. If the value of D is equal to 3 (4 bars) or less, the low fuel warning light LFW is turned ON by instruction 580. Inquiry is then made as to whether D is greater than zero in logic step 581. If D is zero (1 bar), the ISO flash command IF is turned ON by instruction 582 and the system returns to instruction 502. If, however, the value of D is greater than 3 (4 bars) in logic step 579, instruction 582 is bypassed and the system returns to instruction 502.

It will be apparent that many modifications and variations may be effected on the above-described embodiment, as well as the construction of other embodiments, without departing from the scope of the novel concept of this invention. Therefore, it is intended by the appended claims to cover all such modifications and variations which fall within the true spirit and scope of the invention.

We claim:

1. A liquid level measuring system comprising:
 means for containing said liquid within a predetermined volume;
 means within said containing means for sensing the level of said liquid therein and producing an analog signal indicative of said sensed level;
 said level sensing means contains an electrical means having electrical characteristics which vary over a predetermined range in correspondence with a volume range as determined by the maximum and minimum levels that may be sensed within said containing means;
 said electrical means is connected to receive a relatively stable electrical signal from a regulated power supply and to produce said analog signal having a value which varies over a predetermined range as a function of said sensed level, said electrical characteristic and said stable electrical signal;
 means connected to receive said analog signal and to convert said analog signal to a digital signal;
 means responsive to said digital signal for graphically displaying the sensed level of said liquid; and
 wherein said converting means contains means responsive to said analog signal for producing a cyclically varying signal having a frequency within a predetermined range of frequencies corresponding to said range of analog signal values;
 means for sequentially sampling and scaling said cyclically varying signal over sample periods of time that are each long enough to sample several cycles of said cyclically varying signal to produce digital values corresponding to said scaled sample signals;
 means for comparing the most recently produced digital value with the present digital value controlling said display means to verify the accuracy of said most recent digital value;
 means for adjusting said present digital value controlling said display when a predetermined number of respective most recently compared digital values are consistently different in value from said present digital value; and
 means for storing said present digital value for control of said display; and
 further wherein said display means depicts a bar graph comprised of a predetermined number of controlled display elements which when all are activated correspond to said maximum sensed level and whereby other levels are indicated by activating selected number of said display elements corresponding to controlling digital values from said scaling means.

2. A liquid level measuring system as in claim 1, wherein said converting means contains means for defining a first sample period of time mode and a different second sample period of time mode and contains means for selectively switching between said first and second time modes.

3. A liquid level measuring system as in claim 1, wherein said second sample time mode is approximately 16 times longer than said first sample time mode.

4. A liquid level measuring system as in claims 2 or 3, wherein said switching means selects said first sample time mode when said system is initially energized to derive a first digital value to control said display means and then selects said second sample time mode.

5. A liquid level measuring system as in claim 4, wherein said switching means selects said first sample time mode when said most recently compared digital value is greater by a first predetermined amount than said present digital value controlling said display means.

6. A liquid level measuring system as in claim 5, wherein said switching means continues to select said first sample time mode as long as each most recently compared digital value continues to be greater than said present digital value and wherein said adjusting means advances said present digital value as the new digital value that controls said display means.

7. A liquid level measuring system as in claim 1, wherein said display elements are arranged in predetermined groupings to respectively represent equal fractions of the maximum of the display and said display means includes means responsive to said controlling digital value for activating said selected number of said display elements.

8. A liquid level measuring system as in claim 7, wherein said converting means includes means for reading said control digital value from said storing means, means for decoding said read control digital value to define the groups of display elements that are to be displayed by producing a group display signal, and to define the display elements of a partial group that are to be displayed by producing a partial group display signal; and said converting means further includes means controlling said activating means with said partial group display signal for a predetermined period of time to cause display of a number of display elements in said partial group at a preselected viewing level, controlling said activating means with said group display signal for a second predetermined period of time to cause display of a number of groups of display elements at a preselected viewing level, and controlling said activating means with a background display signal to cause display of all groups for a third predetermined period of time at a preselected viewing level that is significantly lower than that of said activated partial groups and activated groups of display elements whereby said liquid level is contrastingly displayed with respect to the entire measurable level range of said display.

9. A liquid level measuring system as in claims 1 or 8, wherein said display means includes an illuminating element designated as a low liquid warning element and said converting means includes means for commanding the activation of said warning element whenever said controlling digital value is at or below a predetermined value.

10. A liquid level measuring system as in claims 1 or 8, wherein said display means includes graphic display elements designating liquid level graduations and said converting means includes means for cyclically flashing said level graduation elements whenever a predetermined number of sequential digital values from said sampling and scaling means each exceed a predetermined digital value to indicate a fault in said sensing means or its connection to said converting means.

11. A liquid level measuring system as in claims 1 or 8, wherein said display means includes a graphic display element designated as an empty tank warning element and said converting means includes means for cyclically flashing said warning element whenever said controlling digital value is at a predetermined value.

12. A method of measuring a liquid level comprising the steps of:
containing said liquid within a predetermined volume;
sensing the level of said liquid within said volume utilizing an electrical means having electrical characteristics which vary over a predetermined range in correspondence with a volume range as determined by the maximum and minimum levels that may be sensed within said predetermined volume;
connecting said electrical means to receive a relatively stable electrical signal from a regulated power supply whereby said electrical means produces said analog signal having a value which varies over a predetermined range as a function of said sensed level, said electrical characteristic and said stable electrical signal;
converting said analog signal to a digital signal; and
graphically displaying the sensed level of said liquid according to the control of said digital signal value;
wherein said step of converting includes the steps of receiving said analog signal and producing a corresponding cyclically varying signal having a frequency within a predetermined range of frequencies corresponding to said range of analog signal values;
sequentially sampling and scaling said cyclically varying signal over sample periods of time that are each long enough to sample several cycles of said cyclically varying signal;
producing digital values corresponding to said scaled samples;
comparing the most recently produced digital value with the present digital value signal controlling said display means to verify the accuracy of said most recent digital value;
adjusting said present controlling digital value signal when a predetermined number of respective most recently compared digital values are consistently different in value from said present digital value controlling said display; and
storing said adjusted digital value to control said display means; and
further wherein said display step utilizes a display means depicting a bar graph comprised of a predetermined number of controlled display elements which, when all are activated, correspond to said maximum sensed level and whereby other levels are indicated by activating selected numbers of said display elements corresponding to said digital value signal.

13. A method as in claim 12, wherein said step of converting includes the steps of defining a first sample period of time mode and a different second sample period of time mode and the step of selectively switching said sampling step to one of said first and second times modes.

14. A method as in claim 13, wherein said second sample time mode is defined as being approximately 16 times longer than said defined first sample time mode.

15. A method as in claim 13 or 14, wherein said first sample time mode is selected when said method is initially commenced to derive a first digital value to control said display and is immediately followed by the selection of said second sample time mode.

16. A method as in claim 15, wherein said first sample time mode is selected when said most recently compared digital value is greater, by a predetermined amount, than said present digital value controlling said display means.

17. A method as in claim 16, wherein said first sample time mode remains selected as long as each most recently compared digital value continues to be greater, by said predetermined amount, than said present digital value and wherein said present digital value is adjusted to a new digital value that controls said display means.

18. A method as in claim 12, wherein said display elements are arranged in predetermined groupings to respectively represent equal fractions of the maximum of the display and wherein the display means includes means responsive to said controlling digital value for activating said selected number of said display elements.

19. A method as in claim 18, wherein said step of converting includes the step of reading said stored control digital value and decoding said read control digital value to define the groups of display elements that are to be displayed by producing a group display signal, to define the dislay elements of a partial group that are to be displayed by producing a partial group display signal; and
controlling said activating means with said partial group display signal for a predetermined period of time to cause display of a number of display elements in said partial group at a preselected viewing level, controlling said activating means with said group display signal for a second predetermined period of time to cause display of a number of groups of display elements at a preselected viewing level, and controlling said activating means with a background display signal to cause display of all groups for a third predetermined period of time at a preselected viewing level that is significantly lower than that of said activated partial group and activated groups of display elements whereby said liquid level is contrastingly displayed with respect to the entire measurable level range of said display.

20. A method as in claims 12 or 19, wherein said display means includes a graphic display element designated as an empty warning element and said converting step includes the step of cyclically flashing said warning element whenever said controlling digital value is at a predetermined digital value.

21. A method as in claims 12 or 19, wherein said display means includes graphic display elements designating liquid level graduations and said step of converting includes the step of cyclically flashing said level graduation elements whenever a predetermined number of sequential digital values produced by said sampling and scaling steps exceed a predetermined digital value to indicate a fault in said sensing step.

22. A method as in claims 12 or 19, wherein said display means includes an illuminating element designated as a low liquid warning element and said step of converting includes the step of activating said warning element whenever said controlling digital value is at or below a predetermined digital value.

* * * * *